UNITED STATES PATENT OFFICE.

THADDEUS HYATT, OF NEW YORK, N. Y., ASSIGNOR TO ELIZABETH A. L. HYATT, OF SAME PLACE.

CONCRETED ILLUMINATING-GRATING.

SPECIFICATION forming part of Letters Patent No. 243,266, dated June 21, 1881.

Application filed January 3, 1881. (No model.)

*To all whom it may concern:*

Be it known that I, THADDEUS HYATT, of the city, county, and State of New York, have invented certain new and useful improvements in the application of hydraulic cements and concretes combined with illuminating-gratings or perforated metal plates, and in means, modes, and processes connected therewith, of which the following is a specification.

The object of my invention, as to "concrete lights," is to prevent the breakage of the glasses which now takes place when they are embedded in concrete. The glasses being then inclosed by a rigid and unyielding wall are supposed to fracture because of the unequal expansions and contractions that take place between the two under the influences of heat and cold, and the circumstance that the same glasses when set in iron grating by means of coal-tar cement do not break has given rise to the idea of interposing some yielding material between the concrete and the glasses. The actual method adopted has been to employ lead-belted glasses; but in practice the plan has proved a failure in the way it has been done, and it has proved a failure because the contraction and expansion theory is unsound. The popular notions on this subject are totally wrong; but the theory is a handy one for the manufacturer of badly-annealed glass. If contractions and expansions, produced by the sun's rays or otherwise, were the cause, every glass in the damaged grating should be broken; whereas many, and in some cases most, of them remain sound. Moreover, it is well known that glasses may be set in the gratings with no cement or other packing about them, as in case of the Walter's illuminating-gratings, where the iron plates, heated to redness at the glass-house, have the glasses pressed into their holes with metal right from the pot. Here we have naked glass directly in contact with naked iron, and these gratings, to the best of my knowledge and belief, have withstood all weathers and seasons. The contraction and expansion theory, therefore, not being supported by facts, we need a better one, and this we may get by considering the nature of the glasses employed in patent-light making and the mode of manufacturing such glasses, a true cure for their breakage being possible whenever we succeed in ascertaining the true cause of the same.

Pressed or flint glass is the article in common use for making illuminating-gratings. From the character of the materials employed in its manufacture, this glass should be stronger and tougher than plate; but it is not so, on the contrary, and this because of the difference in the mode of annealing. On plate-glass manufacture I quote from the Encyclopædia Britannica, as follows, viz: "To anneal glass perfectly, the glass, when first made, must be kept for some time in a state approaching fluidity, and admitting of a uniform molecular arrangement throughout, * * * * the particles of glass having a cohesive polarity which dictates a certain regularity in their arrangement, but which requires time for its development." The article proceeds to say that the glass plates remain sometimes as long as two weeks shut up in hermetically-sealed ovens, during which time the temperature is allowed to gradually sink, no external air being admitted to interfere with the process. But in the manufacture of flint-glass the case is entirely different. The ovens are open at two ends—one, the "hot," where the goods are put in, and the other, the "cold," end, where they are taken out of the leer—the glass during the process being moved constantly forward from the hot to the cold end of the oven. Under these circumstances it is conceivable that currents of air may enter the leer from the cold end that, sweeping in waves over the articles, may injuriously affect the process, causing all to differ and preventing the perfect annealing of any, (it is said that old hands in flint-glass works will often predict a bad lot of glass on a change in the wind;) and yet glasses of this description do not break when hot coal-tar cement is poured around them during the process of fixing in the gratings. Neither do they when molten lead is poured around them during the process of belting them with this metal, the explanation of which is that the heat of the lead and of the coal-tar is so intense and the flow so instantaneous as to flash, as it were, like lightning through the entire glass from circumference to center, causing an instantaneous expansion of the whole; and the surrounding medium being at the same time fluid, the glass meets with no resistance to its expansion, and consequently does not break, the result of this reheating of the glass under these favoring conditions being in effect a perfecting of the original annealing, so that the glass, in place of being injured, is improved by the process; but when the same glasses are placed in the perforated metal plate and surrounded with hydraulic cement or concrete in its cold, moist, and pasty condition, the first effect is to chill the glasses, after which, as the chemical change called "setting" takes place, heat commences to be generated slowly around the peripheries of the glasses, the immediate effect being a slight expansion of their exteriors, the central portions remaining substantially unaffected, the result of this molecular disturbance being a number of imperceptible but real strains within the body of each glass weak enough to be so affected.

The next stage in this process of forming fractured glasses is when the plastic concrete becomes sufficiently hard to resist the expansion of the glasses, for the tendency of the glasses to enlarge by expansion continues after the setting of the concrete in probably even greater degree than before, the maximum of concrete heat being reached after the setting. The effect of boiling coal-tar and molten lead is to bring the glasses to their maximum of expansion before the congealing of the fluid around them, the molecular forces in the glasses tending thereafter in contraction to the centers of the glasses; but with the concrete the operation is all the other way. The glasses are in the very act of expanding and in course of reaching their maximum at the moment when the plastic mass becomes suddenly solid around them. The incipient molecular strains, by this sudden check to the expansion of the glass, become greater, in addition to the new ones thus suddenly created. When gratings containing glasses such as these are laid in position in the public footways and exposed to concussions and to the vibrations incident to the footfalls of a multitude passing over them, it is easy to see how and why an apparently universal fracture of the glasses should suddenly appear; and although the final and obvious fracture may be due to the final and last man who passed over the glass, the actual and primal cause must be referred back to the "original sin" of the glass-works.

My improvements in concrete-light manufacture based upon the foregoing theory are as follows, viz: first, the employment of glasses got out of the plate glass or plate-glass material, or from flint-glass metal, which have been annealed by or according to the plate-glass method of annealing, or by the toughening process of La Bastie, or a method analogous thereto, for combination with plastic concrete as substitutes for the flint glasses now employed in such manufacture; second, employing flint glasses made in the ordinary way in connection with means and processes to prevent the generated heat of the concrete from injuring the glasses surrounded by it during the period of its setting and hardening. These two modes I claim as my invention.

In the use of plate-glass the ragged edges of the small pieces required to be cut from the plates are objectionable. I prefer, therefore, to get them out of plates partially cut through by suitable means at the time the plates are made, as set forth in my English patents for the same, a mode not necessary for me to describe here, my present claims being to the combination of such glass with concrete. For a like reason I describe no special form or construction of oven for producing a perfectly-annealed flint-glass, the requisite of such an oven being an undisturbed temperature of proper character during the annealing of the glasses, a mechanical possibility within reach of the glass-maker, but not immediately important to me, my invention herein being confined as to what I claim—to the combination of flint-glasses so annealed with concrete in the making of concrete lights; in the employment of flint-glasses, as usually made and annealed, and to the means I propose for preventing breakage of same when set in plastic cement.

According to one part of my invention, my improvement consists in the employment of glasses formed with bulging sides, in form resembling the frustums of two cones put base to base, otherwise called "globate." Glasses of this shape I employ either nakedly or belted with lead, in combination with concrete, the same being employed in the usual manner of setting glasses in plastic concrete in the making of concrete lights.

According to another part of my invention, my improvement (whatever the shape of the glasses) consists in warming, heating, and expanding the glasses before combining them with the concrete, a convenient mode of doing this being by means of a water-bath, into which the glasses are placed, the temperature of the water being then gradually raised to the required point of 100° and upward, the concrete of preference being at the same time made with tepid rather than with cold water. The mode of procedure is then the same as in the ordinary making of concrete lights, any hair-cracks about the glasses that may be discovered when the work is finished being made good by grout.

According to another part of my invention, my improvement consists in the employment of water-baths, into which the concrete lights are placed and submerged the moment they are made, the purpose of the water being to carry away from the glasses the generated heat of the concrete, the water at the same time tending to improve the character of the concrete. These water-baths I make to suit the size and shape and number of gratings designed to be placed in them. The gratings are to remain in the bath until the concrete has become cold; but they may remain with advantage for several days.

According to another part of my invention,

I prevent the heat of the concrete from injuring the glasses by means of removable rings, with which I belt each glass before applying the plastic concrete around them, the rings being withdrawn at the earliest moment after the setting of the plastic mass. To facilitate the withdrawal of the rings, which may be made of metal or any suitable material and of about one-eighth of an inch in thickness, they should be tapering, the glasses being shaped to match. By the withdrawal of the rings a cooling-channel is left about each glass, which preserves it from injury until the concrete becomes cold. The channel is to be then made good by cement or grout.

According to another part of my invention having reference to the manufacture of "lead-band lights" or illuminating-gratings, the glasses of which are first belted with lead, my improvement consists in cheapening the same by a new method of confining the lead-belted glasses to their seats in the grating. By the common mode of manufacture the apertures of the grating are first smeared with white lead in the form of a thick paste. The belted glasses are then inserted and driven home by means of a hammer and wooden plug, the end of which is made to fit upon the glass. After this iron "sets" are employed for calking the seam between lead and iron, the whole process being tedious and expensive, and when finished so much uncertainty exists as to the water-tight character of the joints around the glasses that it is necessary to place every tile bottom-side upward and fill the apertures over the glasses with water to test the joints. This consumes many hours. Moreover, the holes of the grating vary so much in size that as many as five or six different sizes of lead bands are required to fit them, coupled with the labor and time necessary to fit them before proceeding with the work of setting them in the grating. All this adds so largely to the cost of this kind of light that they have measurably gone out of use, although the most durable light ever manufactured. By my improved method but one size of lead band is required, this being small enough to suit the smallest hole in the grating. The glasses are of the usual shape and belted with lead in the usual way. They are then placed in the grating as naked glasses are placed, and cement—preferably hydraulic cement—is put about them in the way of setting naked glasses. I should here remark that the process of belting the glasses with molten lead is really a method of toughening the glasses, and in this lies the value of the lead-band light. In combining the lead-belted glasses with concreted gratings, instead of placing them in position upon the metal plate or floor and surrounding them with plastic concrete, I first manufacture concreted gratings with open holes, according to my patent No. 236,817, dated January, 1881, and then set the lead-belted glasses in the open holes of the concrete and cement them therein, as I would naked glasses, by this method obtaining all the value of the glasses toughened by the lead-belting process, together with the advantages of the concrete-surface grating.

Another part of my invention, having reference to the construction of illuminating-grating roofs, consists in making them of open gratings or perforated metal plates made completely fire-proof by an incasement, or partially so, by an overlayer of hydraulic cement, concrete, or equivalent fire-resisting material, the apertures of the gratings or perforated plates not being closed by glass in the usual manner of making illuminating-grating roofs, but left open, and yet protected against the weather by an outside covering of glass of any desired cheapness or thickness, the same being glazed in removable sashes made to be opened for ventilating or glazed in sashes fixed and permanent where ventilation is not required. I construct these roofs in the ordinary way of making illuminating-roofs.

The mechanical construction of illuminating-grating roofs and movable sashes being well understood, and forming no part of this invention, is not necessary to be described.

Having thus fully set forth the nature and scope of my invention in its various parts and applications, what I claim, and desire to secure by Letters Patent, is—

1. Concreted illuminating-gratings or perforated metal plates made by combining with the same while the concrete is yet plastic glasses that have been toughened by the process of La Bastie, or by analogous process, or that have been annealed by the plate-glass method of hermetically-sealed ovens, or that have been got out of the plate-glass itself, substantially as and for the purposes herein set forth.

2. Concreted illuminating-gratings or perforated metal plates made by combining with the same while the concrete is yet plastic glasses of such form or glasses so conditioned or protected as to prevent the generated heat of the plastic concrete from injuring the glasses during the setting and hardening of the concrete, substantially as and for the purposes herein set forth.

3. Combining lead-belted glasses with naked metal gratings or perforated plates, or with concreted metal gratings or perforated plates, by means of hydraulic cement or equivalent cementing material, substantially as and for the purposes herein set forth.

4. Illuminating-roofs constructed of gratings or perforated metal plates inclosed by or overlaid with fireproofing material, in combination with apertures not closed with glasses, but left open for ventilation, or otherwise, substantially as and for the purposes herein set forth.

THADDEUS HYATT.

Witnesses:
W. H. RUFF,
LEIGH ROBINSON.